(12) United States Patent
Sundholm

(10) Patent No.: US 8,992,133 B2
(45) Date of Patent: Mar. 31, 2015

(54) METHOD AND ARRANGEMENT IN PNEUMATIC MATERIAL CONVEYING SYSTEM

(75) Inventor: Göran Sundholm, Tuusula (FI)

(73) Assignee: Maricap Oy, Vantaa (FI)

( * ) Notice: Subject to any disclaimer, the term of this patent is extended or adjusted under 35 U.S.C. 154(b) by 495 days.

(21) Appl. No.: 12/933,334

(22) PCT Filed: Mar. 5, 2009

(86) PCT No.: PCT/FI2009/050180
§ 371 (c)(1),
(2), (4) Date: Sep. 17, 2010

(87) PCT Pub. No.: WO2009/115640
PCT Pub. Date: Sep. 24, 2009

(65) Prior Publication Data
US 2011/0013993 A1    Jan. 20, 2011

(30) Foreign Application Priority Data
Mar. 18, 2008    (FI) ..................................... 20085228

(51) Int. Cl.
B65G 53/00 (2006.01)
B65G 53/24 (2006.01)
B65F 5/00 (2006.01)

(52) U.S. Cl.
CPC ................ *B65G 53/24* (2013.01); *B65F 5/005* (2013.01)
USPC ............. 406/197; 406/55; 406/106; 406/173; 141/7

(58) Field of Classification Search
USPC .......................... 141/7; 406/55, 106, 173, 197
See application file for complete search history.

(56) References Cited

U.S. PATENT DOCUMENTS

| | | | | |
|---|---|---|---|---|
| 4,351,373 A | * | 9/1982 | Mechalas | 141/51 |
| 4,480,560 A | | 11/1984 | Lennon | |
| 4,555,254 A | * | 11/1985 | Fisher | 55/345 |
| 4,834,586 A | * | 5/1989 | Depew | 406/18 |
| 4,947,903 A | * | 8/1990 | Beckwith | 141/67 |
| 5,284,187 A | * | 2/1994 | Schmit | 141/1 |
| 5,839,484 A | * | 11/1998 | Engle | 141/65 |
| 6,045,298 A | * | 4/2000 | Lytle | 406/48 |

(Continued)

FOREIGN PATENT DOCUMENTS

DE    42 39 305 C2    6/1993
GB    2 266 696 A    11/1993

(Continued)

*Primary Examiner* — Joseph Dillon, Jr.
(74) *Attorney, Agent, or Firm* — Birch, Stewart, Kolasch & Birch, LLP

(57) ABSTRACT

A method in a pneumatic material conveying system, such as in a waste conveying system, said conveying system comprising at least one feed point (61) of material, particularly waste material; a material conveyor pipe (100) that is connectable to the feed point (61); and a separator device (20), where the material to be conveyed is separated from the conveyor air; as well as means (3) for creating a pressure difference in the conveyor pipe (100), at least for the duration of the process of conveying the material. In the method, material is conveyed further from the separator device (20) to the transport container (51), particularly a waste container, by employing in the conveying of material from the separator device to the transport container means (3) of the material conveying system for creating a pressure difference.

15 Claims, 5 Drawing Sheets

(56) References Cited

U.S. PATENT DOCUMENTS

| | | | |
|---|---|---|---|
| 6,079,461 A * | 6/2000 | Fisher et al. | 141/231 |
| 6,776,561 B1 * | 8/2004 | Yeh | 406/33 |
| 6,868,876 B2 * | 3/2005 | Nobbe | 141/286 |
| 7,785,044 B2 * | 8/2010 | Sundholm | 406/48 |
| 7,833,318 B2 * | 11/2010 | Snowdon | 95/273 |
| 7,836,921 B2 * | 11/2010 | Isomura et al. | 141/67 |
| 7,909,069 B2 * | 3/2011 | Hughes | 141/7 |
| 8,313,268 B2 * | 11/2012 | Kords et al. | 406/109 |
| 2005/0016700 A1 * | 1/2005 | Hoffmann et al. | 162/55 |
| 2007/0183855 A1 | 8/2007 | Sundholm | |
| 2010/0215443 A1 * | 8/2010 | Sundholm | 406/51 |
| 2010/0272520 A1 * | 10/2010 | Sundholm | 406/168 |
| 2010/0278598 A1 * | 11/2010 | Sundholm | 406/117 |
| 2010/0303556 A1 * | 12/2010 | Sundholm | 406/12 |
| 2010/0303559 A1 * | 12/2010 | Sundholm | 406/122 |
| 2010/0310326 A1 * | 12/2010 | Sundholm | 406/85 |
| 2010/0310327 A1 * | 12/2010 | Sundholm | 406/106 |
| 2011/0002748 A1 * | 1/2011 | Sundholm | 406/46 |
| 2011/0013994 A1 * | 1/2011 | Sundholm | 406/154 |
| 2012/0155975 A1 * | 6/2012 | Sundholm | 406/84 |
| 2012/0201614 A1 * | 8/2012 | Sundholm | 406/168 |
| 2012/0301230 A1 * | 11/2012 | Marchesini et al. | 406/172 |
| 2013/0004248 A1 * | 1/2013 | Sundholm | 406/168 |
| 2013/0004249 A1 * | 1/2013 | Sundholm | 406/168 |

FOREIGN PATENT DOCUMENTS

| | | |
|---|---|---|
| JP | 62-4129 A | 1/1987 |
| JP | 10252404 A | 10/1989 |
| JP | 3-284503 A | 12/1991 |
| JP | 2007225195 A | 9/2007 |
| WO | WO 2009/022964 A1 | 2/2009 |

* cited by examiner

METHOD AND ARRANGEMENT IN PNEUMATIC MATERIAL CONVEYING SYSTEM

BACKGROUND OF INVENTION

The invention relates generally to pneumatic conveying systems, such as vacuum conveying systems, particularly to collecting and conveying waste, for instance household waste.

There are known systems where waste is conveyed in a piping by means of suction. In these, waste is conveyed by suction for long distances in the piping. Apparatuses are utilized, for instance, for conveying waste in different institutions. Typical for them is that a vacuum apparatus is used for achieving a pressure difference, in which apparatus underpressure in the conveyor pipe is provided with vacuum generators, such as vacuum pumps or ejector equipment. In the conveyor pipe, there is typically arranged at least one valve element, and by opening and closing said valve element, make-up air coming in the conveyor pipe is regulated. The vacuum conveying systems typically have, among others, the following problems: high energy consumption, high air flow in the piping, problems with noise, dust and fine particles in the outlet pipe. In known systems, material has been conveyed from the system containers to a transport container, such as the container of a waste transport truck, by a suction pump device that is external to the system, for instance by a suction pump device of the transport truck or a corresponding device. This means that the vehicles used in the forward transportation of the material have been specific transport trucks provided with suction arrangement, which increases, among others, the amount of capital bound in the equipment.

An object of this invention is to achieve a totally novel arrangement in connection with material conveying systems by means of which the drawbacks of known arrangements are avoided. Another object of the invention is to provide an arrangement applicable to vacuum conveying systems by means of which the amount of capital bound in the transportation equipment can be decreased. A third object of the invention is to provide a solution by which the amount of specific transportation equipment can be reduced.

BRIEF DESCRIPTION OF INVENTION

The invention is based on an idea where the suction pump system of the vacuum conveying system itself is utilized in conveying material from said vacuum conveying system to an external transport container, for instance to a transport container located in a transport wagon or in a vehicle.

The method according to the invention is mainly characterized in that material is forwarded from the separator device to a transport container, particularly to a waste container, by using in the conveying of material from the separator device to the transport container, equipment of the conveying system for creating a pressure difference.

The arrangement according to the invention is mainly characterized in that the arrangement comprises means for connecting a transport container to the material conveying system, and means for conveying at least part of the material accumulated in the separator device from the separator device to the transport container, particularly a waste container, by using in the conveying of material from the separator device to the transport container equipment of the material conveying system for creating a pressure difference.

The arrangement according to the invention has several remarkable advantages. By means of the arrangement according to the invention, pump elements of the system itself can be used for draining the material conveying system and for conveying material to a transport container. By utilizing the suction/pressure of the material conveying system, waste is conveyed for example to the tank of a transport vehicle. Now the transport vehicle can be any possible vehicle provided with a suitable container, such as a shipping container or the like. Consequently, a special truck provided with a suction pump, or a corresponding vehicle, is not needed in the arrangement according to the invention for draining the material conveying system. This results in remarkable savings both financially and with respect to energy consumption. When the system piping is arranged to comprise a circuit where at least part of the conveyor air circulates, the amount of outlet air can be reduced. At the same time, energy consumption in the system is reduced. By maintaining both underpressure and blowing, there can be achieved an efficient circulation of conveyor air in the circuit, and an efficient transport of material in the conveyor pipe. The amount of outlet air can be essentially reduced by an arrangement according to the invention, and at the same time possible problems with dust and fine particles in the outlet pipe can be eliminated. The arrangement according to the invention also essentially alleviates the problem with noise known in the prior art. As the amount of inlet air is reduced, energy consumption is likewise reduced. By opening and closing the system feed points according to the invention, there is achieved an efficient material transport to the conveyor pipe and forwarding in the conveyor pipe, and simultaneously the noise effect caused by the operation of the system can be maintained low. When the conveyor pipe of the material conveying system is arranged to be composed of several functional sections, i.e. sub-circuits, both the conveying of material in the conveyor piping and the draining of the feed points to the conveyor pipe can be efficiently arranged. Blockages can be efficiently cleared by making the conveyor air circulate in the opposite direction. In a loop piping, the direction of circulation of the conveyor air can be easily changed. The arrangement according to the invention is applicable both in conventional conveying systems including one or several conveyor pipes, and in conveying systems with a loop piping.

BRIEF DESCRIPTION OF DRAWINGS

In the description below, the invention is explained in more detail with reference to the appended drawings, wherein FIG. 1a is a simplified illustration of part of the system according to the invention.

DETAILED DESCRIPTION OF INVENTION

Figure 1:
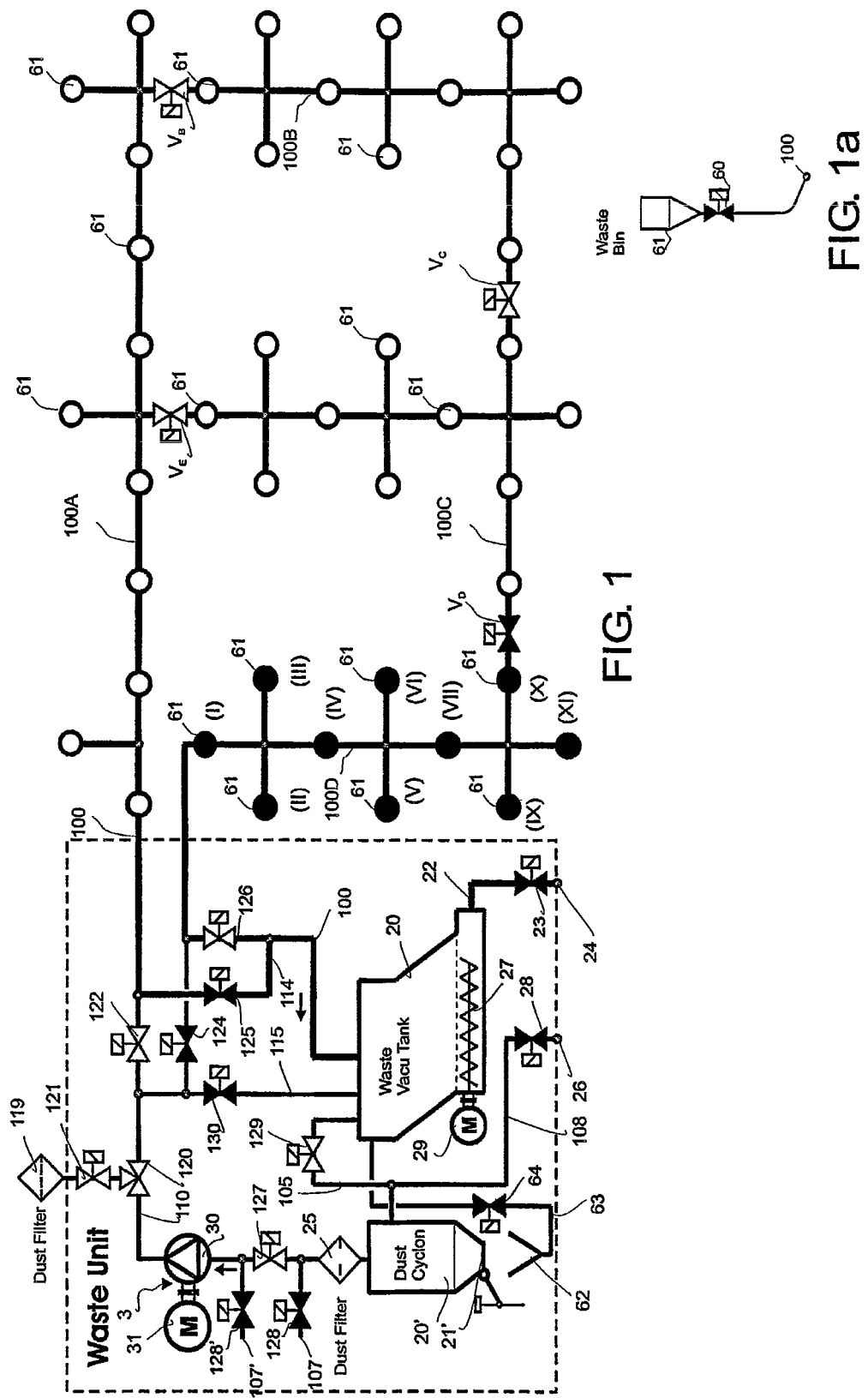
FIG. 1 is a schematical illustration of a system according to a preferred embodiment of the invention.

FIG. 1 is a simplified schematical illustration of a pneumatic material conveying system according to the invention, particularly a waste conveying system. The drawing shows a material conveyor pipe 100, along which pipe there is arranged at least one, but typically several feed points 61. A feed point 61 is the feed station of the material to be conveyed, particularly waste material, through which feed point the material to be conveyed, particularly waste material, such as household waste, is fed to the conveying system. The system may comprise several feed stations 61, through which the material to be conveyed is fed to the conveyor piping 100, 100A, 100B, 100C, 100D, 100E. In the drawing, the feed station 61 is designated by a spot, and by opening and closing a locking element, such as a valve element 60, provided in connection with the feed station, material can be conveyed from the feed point to the conveyor pipe. FIG. 1a illustrates in more detail a feed point 61 and its drain valve 60a used in the system according to the invention. On the valve side, the feed point is connected to a conveyor pipe 100. Typically the conveyor piping comprises a main conveyor pipe 100, to which there may be connected several branch conveyor pipes, to which in turn there may be connected several feed stations 61. The fed material is conveyed along the conveyor piping 100, 100A, 100B, 100C, 100D to a separator device 20, where the material to be conveyed is separated from the conveyor air, for instance as the flow rate drops and owing to centrifugal force. The separated material is removed, for instance according to the needs of the situation, from the separator device 20 to a material container, such as a waste container 51, or to further processing.

From the separator device 20, a conveyor air duct 105 leads to means 3 for creating underpressure in the conveyor pipe. In the embodiment of FIG. 1, the means for creating underpressure comprise a vacuum pump unit 3. By the means for creating underpressure, there is generated the required underpressure in the conveyor piping 100 and/or part thereof for conveying the material. The vacuum pump unit 3 comprises an underpressure pump 30, which is driven by an actuator 31.

FIG. 1 illustrates a pneumatic material conveying system, particularly a waste conveying system, according to a preferred embodiment of the invention. The drawing depicts a material conveyor pipe 100, along which there is arranged at least one, typically several feed points 61. A feed point 61 serves as the feed station of the material to be conveyed, particularly waste material, through which the material to be conveyed, particularly waste material, such as household waste, is fed to the conveying system. The system may comprise several feed stations 61, through which the material to be conveyed is fed to the conveyor piping 100, 100A, 100B, 100C, 100D, 100E. In the drawing, a feed station 61 is designated by a spot, and by opening and closing a locking element, such as valve element 60 provided in connection with the feed station, material can be conveyed from the feed point 61 to the conveyor pipe 100. FIG. 1a illustrates in more detail a feed point 61 to be used in a system according to the invention, and its drain valve 60. On the valve side, the feed point is connected to the conveyor pipe 100 or to a pipe provided in connection with it. Typically a conveyor piping comprises a main conveyor pipe 100, to which there may be connected several branch conveyor pipes, to which in turn there may be connected several feed stations 61. The supplied material is conveyed along the conveyor piping 100, 100A, 100B, 100C, 100D to a separator device 20, where the material to be conveyed is separated, for example as the flow rate drops, and owing to centrifugal force, from the conveyor air. The separated material is removed, for example according to the needs of the situation, from the separator device 20, to a material container, such as a waste container 51, or to further processing.

In the embodiment of FIG. 1, the separator device 20 is provided with material stirring/conveying elements 27, 29. A conveyor air duct 105 leads from the separator device 20 to the means 3 for creating underpressure in the conveyor pipe.

In the embodiment of the drawing, the means for creating underpressure comprise a pump device 3, such as a vacuum pump unit. By the means for creating underpressure, there is achieved the underpressure required for conveying material in the conveyor piping 100 and/or a section thereof. The vacuum pump unit 3 comprises an underpressure pump 30, which is driven by an actuator 31. The system comprises means for circulating conveyor air in a circuit, and at least a section of the conveyor piping 100, 100A, 100B, 100C, 100D, 100D, 100E forms part of said circuit. In the embodiment of FIG. 1, the conveyor piping 100 can be divided into functional sections or sub-circuits 100A, 100B, 100C, 100D, 100E, by valve elements $V_B$, $V_C$, $V_D$, i.e. sectional valves.

FIG. 1 illustrates a situation where the valve element $V_D$ is closed, in which case conveyor air is prevented from flowing in the circuit. When the suction end of the vacuum generator 3 is connected directly or by intermediation of an air duct 105 to at least one separator device 20, 20', to which in turn the outlet end of the conveyor pipe 100 is connected, there is achieved underpressure in the conveyor pipe, at least in that part of the circuit that is located, in the material conveying direction, between at least one valve, in FIG. 1 valve $V_D$, and the separator device 20. The material conveying direction and the air flowing direction are designated by arrows in FIG. 1. Underpressure also prevails in that part of the circuit that is left between the separator device 20 and the vacuum generator 3, i.e. in the conveyor air duct 105, and in the embodiment of the drawing also in a second separator device 20', i.e. a dust filter, and in that part of the conveyor air duct 105 that extends from said separator device 20' to the vacuum generator 3. In a case according to the drawing, when at the feed point 61 its valve element 60 is opened, the batch of material to be conveyed is transferred to the conveyor pipe 100, in the drawing through the part 100D of the conveyor pipe, to be further conveyed to the separator device 20. Possible makeup air enters the conveyor pipe for example via the feed point 61 when opening the valve 60 to the conveyor pipe.

In the embodiment according to FIG. 1, the outlet end of the underpressure pump 30 of the pump device 3 is in said mode of operation arranged to blow into the channel 110. There can efficiently be created overpressure at the pump outlet end, and/or underpressure and/or a suction effect at the suction end of the pump device.

Figure 2:
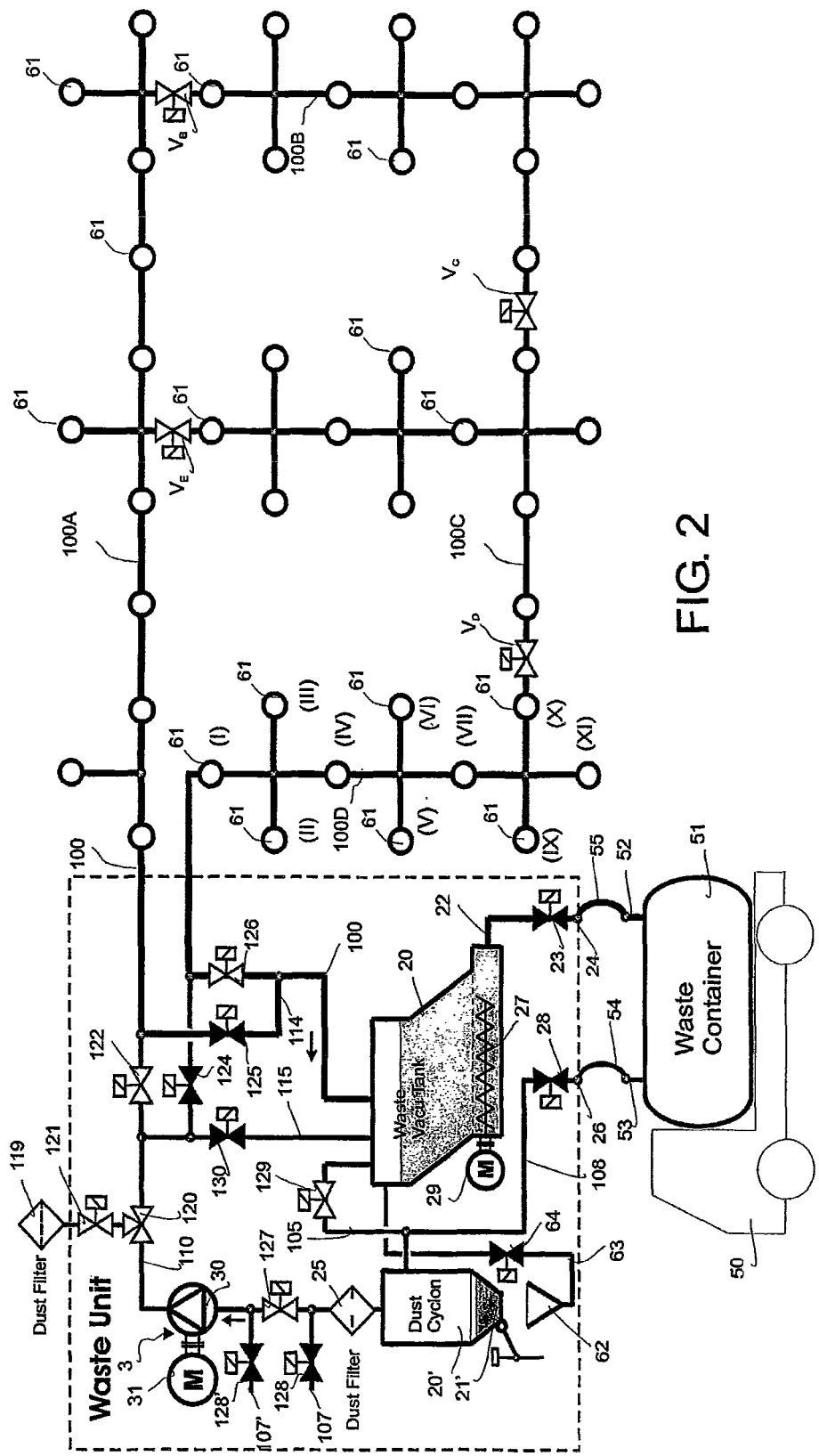
FIG. 2 is a schematical illustration of a system according to the invention, shown in a second mode of operation.

The operation of the system is controlled so that for draining feed points 61 within a desired one of the functional 100D of the conveyor pipe 100, at least one valve is open in the material conveying direction, with respect to the functional section of the conveyor pipe 100, said valve being located on the go-side of the conveyor air, i.e. on the suction side, in which case suction can affect the conveyor pipe 100 within the functional section. Let us assume that in the arrangement according to FIGS. 1 and 2, the aim is to realize the draining of the feed points 61 within the range of function section 100D of the conveyor pipe 100. Now all sectional valves 122, 124, 125, 126, 130 located between the separator element 20 and the functional section 100D in the conveyor pipe 100 (in FIGS. 1 and 2, functional section 100D of the conveyor pipe 100) in the conveying direction are open (valve 126 in FIGS. 1 and 6). Now the suction created by at least one vacuum generator 3 is effective in the functional section 100D of the conveyor pipe 100. At least one valve $V_D$ located on the outlet side of the conveyor pipe 100 is closed, and thus only suction is now effective within the functional section 100D. The feed points 61 of the functional section 100D, or at least part of them, are drained so that the first connection to the functional section 100D of the conveyor pipe 100 to be opened is the connection of the feed point 61 (I) that is located in the conveyor pipe 100 nearest to the outlet end in the conveying direction, i.e., in the embodiment according to FIGS. 1 and 2, nearest to the separator device 20, so that material can be conveyed from the first feed point to the conveyor pipe 100, and before the connection of the first feed point (I) to the connection conveyor pipe 100 is closed, the connection of the next feed point 61 (II) to the conveyor pipe 100 is opened. In the embodiment of FIGS. 1 and 2, said next feed point is, when proceeding against the conveying direction, the next feed point 61 (II) to be drained. Thereafter, the connection of the first feed point 61 (I) to the conveyor pipe 100 is closed. Respectively, the connection to the conveyor pipe 100 of a third feed point 61 (III) to be drained is opened before the connection of the second feed point 61 (II) to the conveyor pipe 100 is closed. This step is repeated until all desired feed points 61 are drained. In the embodiment of FIGS. 1 and 2, it is assumed that all of the feed points 61 within the range of the functional section 100A, 100B, 100C, and 100D of the conveyor pipe 100 should be drained, in which case their draining order to the conveyor pipe 100, is in FIGS. 1 and 2 designated by ordinals in parentheses: (I), (II), (III), (IV), (V), (VI), (VII), (VIII), (IX), (X), (XI) and (XII). When the communication to the conveyor pipe 100 of the last feed point 61 (XII) to be drained within the functional section 100D is opened, and when the material is transferred to the functional section 100D of the conveyor pipe 100, and the communication between the feed point and the conveyor pipe 100 is closed, there is opened a connection to the functional section 100D of the conveyor pipe 100 on the outlet side by opening at least one valve element $V_D$, which is located between the functional section 100D and the pump device 3, blowing into the conveyor pipe 100. Now there is achieved an enhanced conveying effect (suction and blow together) for the conveyed material that is transferred to the conveyor pipe 100, and conveying pipe sections 100A, 100B, 100C, 100D. In FIGS. 1 and 2, the conveyor air circulates along a route designated by arrows (See FIGS. 1 and 2), so that the batches of material transferred through the feed points 61 to the conveyor pipe 100, proceed in the conveyor pipe 100 further to the separator device 20, where the material to be conveyed is separated from the conveyor air. In FIGS. 1 and 2, the sectional valve $V_E$ of the conveyor pipe 100 of the functional section 100B is closed, in which case the conveyor air has no access to the functional section 100D of conveyor pipe 100, but it flows along the circulating route of conveying pipe sections 100A, 100B, 100C, 100D of the conveyor pipe 100 of the range. In connection with draining different conveying pipe sections 100A, 100B, 100C. 100D, the material conveying route from the different conveying pipe sections 100A, 100B, 100C. 100D to a draining station, such as a separator element 20, can be optimized by keeping the sectional valves located along the desired transport route open.

FIG. 2 illustrates a mode of operation in a system according to the invention, where conveyor air is free to circulate along a circuit of which at least a section of the conveyor pipe 100 forms part, and which in the embodiment of the drawing includes a separator device 20, a conveyor air duct 105, a possible second separator device 20', and an air duct 110 from the outlet end of the vacuum generator to the go-side of the conveyor pipe 100. The vacuum generator 3 is arranged to circulate air in the circuit and to create a suction effect in the conveyor pipe 100, at least at its outlet end, i.e. at the end that is located on the side of the separator element 20 in the conveying direction. According to the embodiment of the drawing, the vacuum generator 3 also is arranged to create a blow effect in the conveyor pipe, in the drawing through the air duct 110. Conveyor air has free access to circulate in the circuit, at least part of which is formed by at least a section of the feed pipe 100, so that the batches of material fed into the conveyor pipe from one or more feed stations 61 are transferred towards the separator device 20.

In the embodiment of the drawing, there also is formed a conduit 107 provided with a valve 128, and by opening said valve, supplementary air can be fed to the suction end of the vacuum unit 3 from outside the circuit. When necessary, air pressure in the conveyor pipe can be increased by opening the valve 128, so that there is achieved an enhanced conveying rate for the conveying of material.

In the case of FIG. 2, a transport container 51 is brought to the system by a transport vehicle 50, such as a transport wagon or a transport truck. The arrangement comprises means for connecting the transport container 51 to the material conveying system and means for transferring at least part of the material accumulated in the separator device 20 from the separator device 20 to the transport container 51, particularly a waste container, by employing, in the conveying of material from the separator device 20 to the transport container 51, means 3 of the material conveying system for creating a pressure difference. From the separator element 20, particularly its lower part, there is arranged drain channel 22. The drain channel is provided with a valve element 23. The drain channel has a junction 24, at which the channel 55, 52 of a transport container can be connected to the drain channel 22 of the separator element. The arrangement comprises means for connecting the transport container 51 to the separator device 20 by at least one first conveyor channel 22, 23, 24, 55, 52, and means for connecting the transport container to the suction end of the pump device 3 of the material conveying system at least by one second channel 108, 28, 26, 53, 54, so that material can be transferred from the separator device 20 to the transport container 51 by means of the suction created by the pump device 3 of the material conveying system. The second channel includes a channel section 108, which in the embodiment of FIG. 2 is connected to the conveyor air duct in between the separator element 20 and the second separator element 20'. The second channel is provided with a valve element 28. Furthermore, it is provided with a junction 26, at which the second channel is connected to the second channel 53, 54 of the transport container 51. In the embodiment of the drawing, the valves 28 and 23 are in closed position, in which case the system suction cannot affect the transport container 51, and the material cannot proceed from the separator element 51 to the transport container 51.

The transport container 51 is arranged to be connected as part of a circuit where the conveyor air is circulated at least during the process of transferring the material by the pump device 3, the suction end whereof is arranged to be connected to at least one transport container 51 and separator device 20, preferably to its lower part, and so that at least part of the conveyor air on the pressure side of the pump is arranged to be conveyed to the separator device 20, preferably to its upper part.

The transport container 51 is arranged in a transport vehicle 50, such as a transport wagon or a transport truck.

An embodiment of the arrangement according to the invention comprises at least one second separator device 20', which is arranged on the suction side of the pump device 3, in between the transport container 51 and/or the first separator device 20 and the pump device 3.

The separator device 20 comprises material stirring and/or conveying means 27. In the embodiment of the drawing, the stirring/conveying means 27 comprise a conveyor/blender screw arranged in the lower part of the separator element, which screw is driven by an actuator 29. The stirring/conveying means are preferably arranged to convey material in the separator element towards the drain channel 22.

Figure 3:
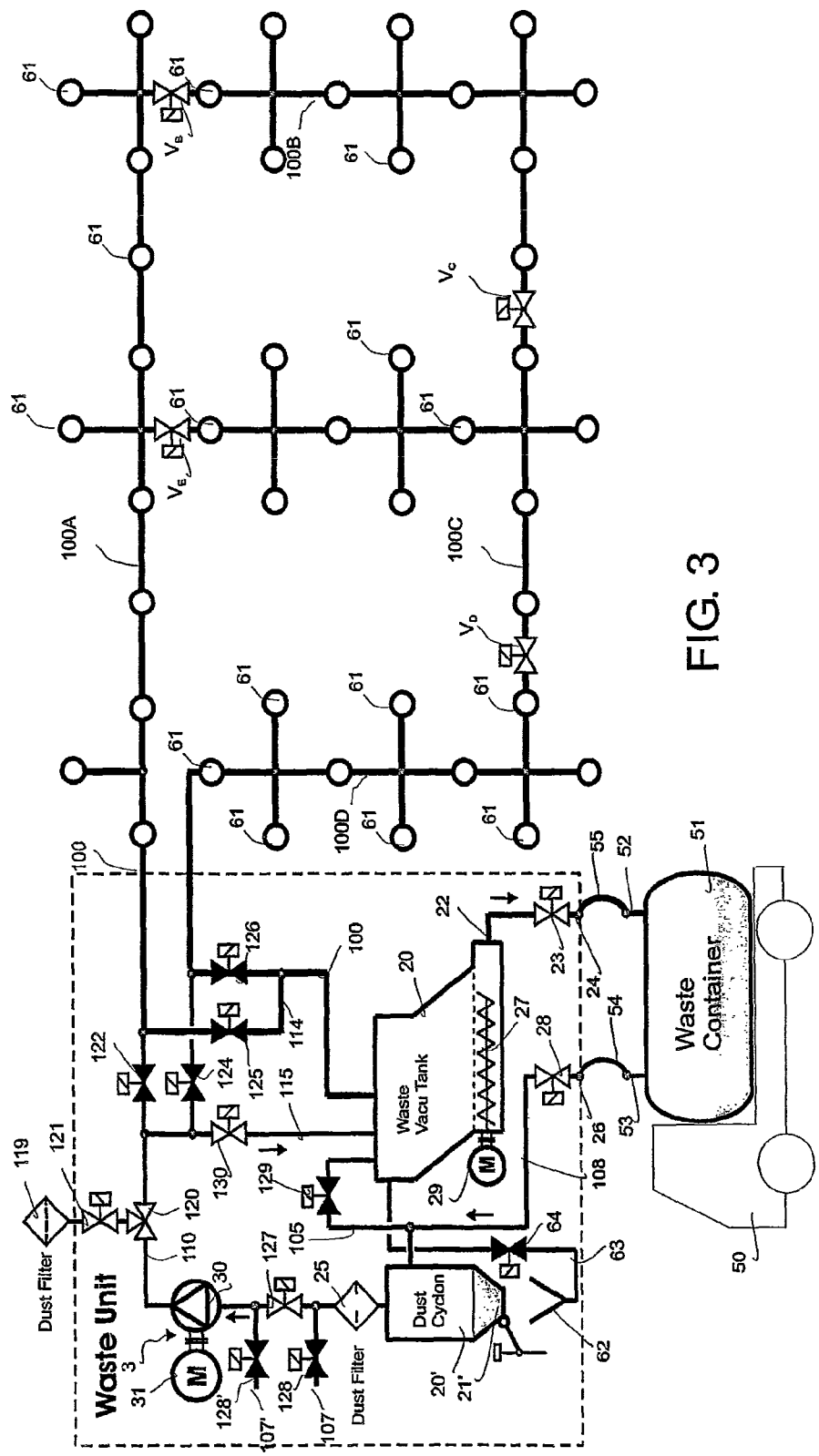
FIG. 3 is a schematical illustration of a system according to the invention, shown in a third mode of operation.

FIG. 3 illustrates a mode of operation of the system, where the connection from the separator element 20 is opened to the transport container and respectively, the connection from the suction end of the pump is opened to the transport container, so that material is transferred from the separator element 20 via the drain channel 22 to the transport container 51. From the outlet end of the pump element, there also is provided a connection 115 to the upper part of the separator element 20, in which case the conveying process can be enhanced by means of a combined effect of suction and blowing. In this mode of operation, in the embodiment of the drawing, the connection from the conveyor piping 100 to the separator element is closed, and also the connection from the outlet end of the pump element to the conveyor piping 100 is closed. The connection from the pump suction end to the separator element 20 is now made via the transport container 51.

Figure 4:
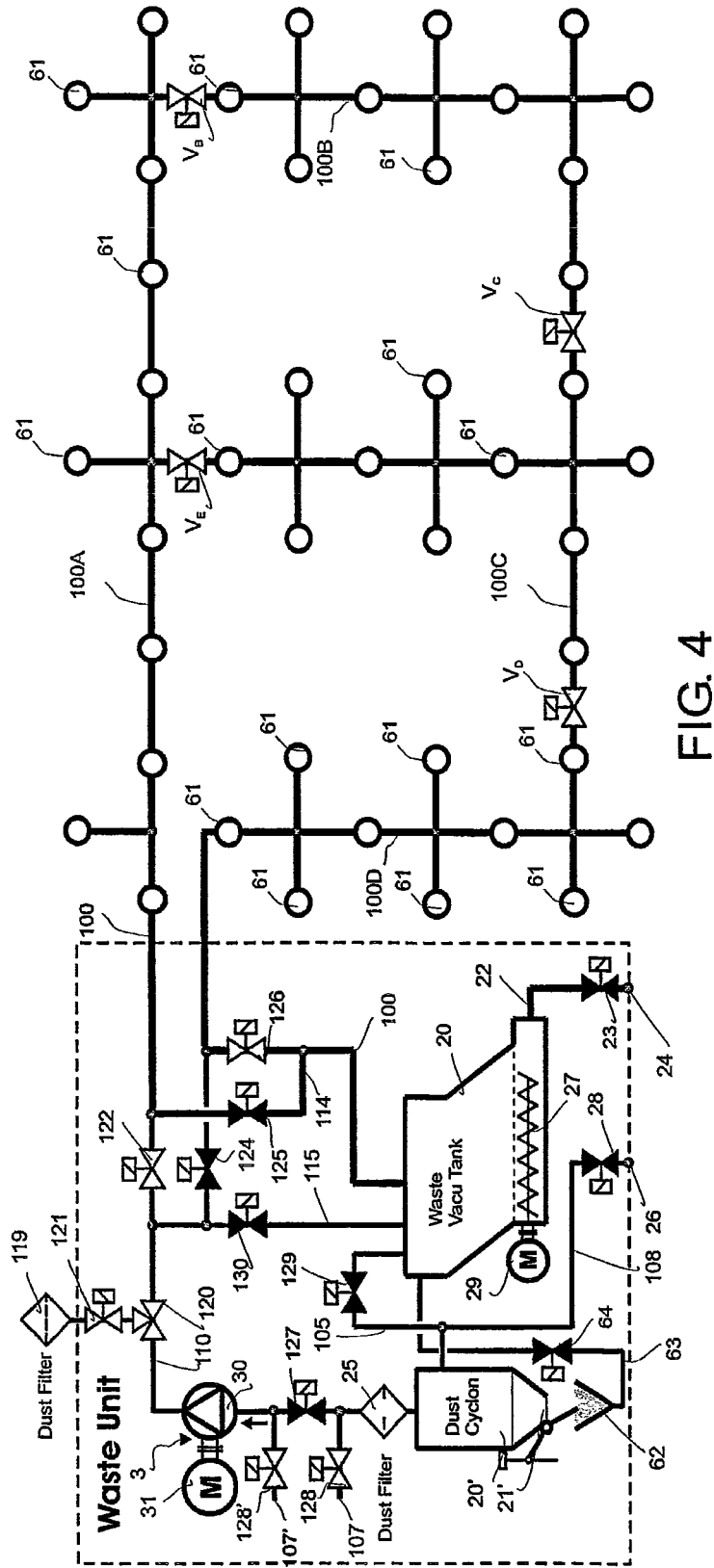
FIG. 4 is a schematical illustration of a system according to the invention, shown in a fourth mode of operation.
Figure 5:
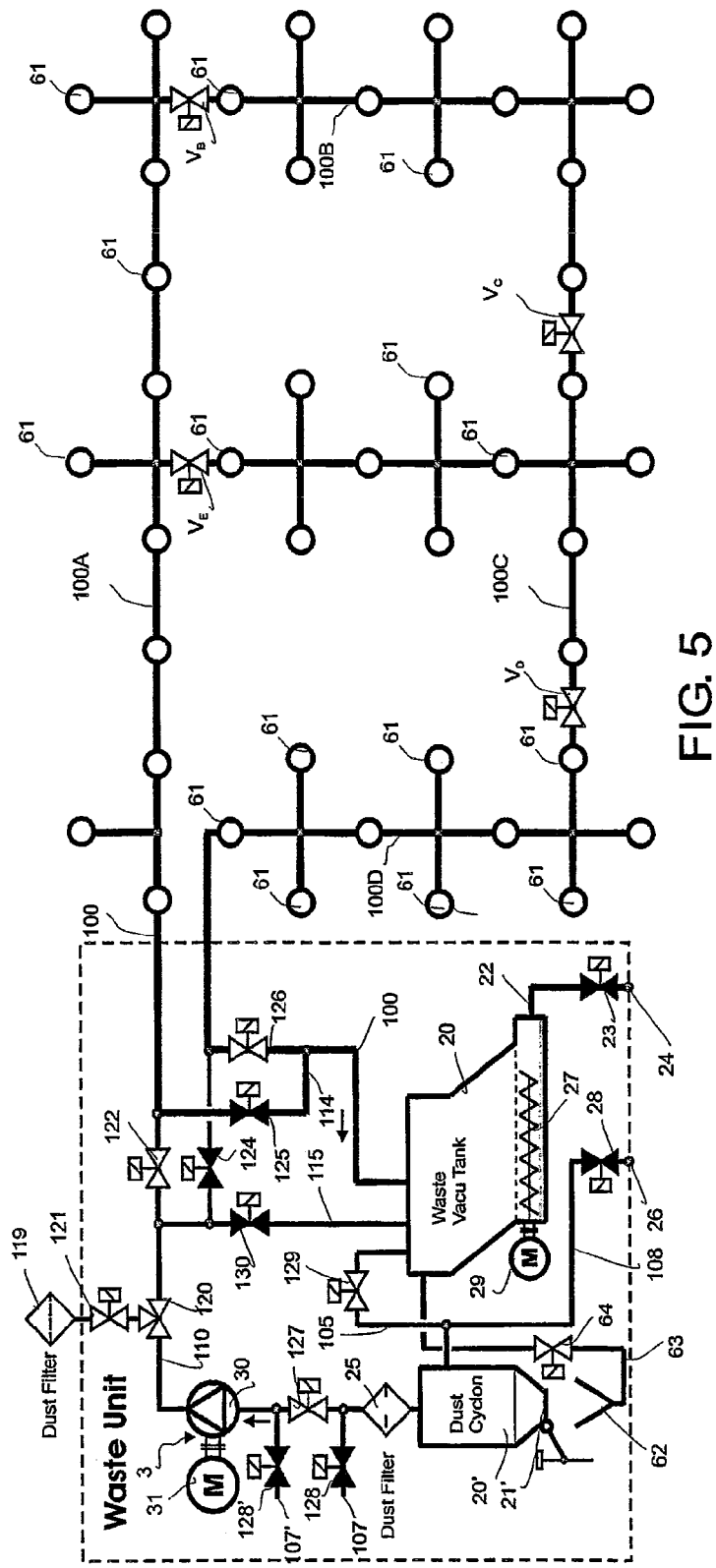
FIG. 5 is a schematical illustration of a system according to the invention, shown in a fifth mode of operation.

FIG. 4 illustrates yet another embodiment of a system according to the invention, depicting a mode of operation where the material accumulated in the second separator device 20' is drained into a collector element 62, which in the drawing is a feeding funnel. From the collector element 62, there is made a conveyor channel 63 to the separator element 20. The conveyor channel 63 is provided with a valve element 64, by which the connection from the collector element 62 to the separator device 20 can be opened and closed. The collector element can be drained, and the material can be conveyed therefrom to a separator device 20, by connecting the suction of the pump device 3 to affect the separator device 20, and by opening the valve element 64 of the conveyor channel, in which case material is transferred from the collector element to the separator device 20 (FIG. 5).

Thus the invention relates to a method in a pneumatic material conveying system, such as a waste conveying system, said conveying system comprising at least one feed point 61 of material, particularly waste material; a material conveyor pipe 100, which is connectable to the feed point 61; and a separator device 20, where the material to be conveyed is separated from the conveyor air; as well as means 3 for creating a pressure difference in the conveyor pipe 100, at least for the duration of the process of conveying the material. In the method, material is further transferred from the separator device 20 to the transport container 51, particularly a waste container, by employing in the conveying of material from the separator device to the transport container means 3 of the material conveying system for creating a pressure difference.

According to a preferred embodiment, in the method the transport container 51 is connected to the separator device by at least one first conveyor channel 22, 55, and the transport container is connected to the suction side of the pump device of the material conveying system by at least one second channel 108, 54, so that material is conveyed from the separator device 20 to the transport container 51 by means of the suction created by the pump device 3 of the material conveying system.

According to a preferred embodiment, in the method the transport container 51 is connected to form part of a circuit where conveyor air is circulated, at least during the process of conveying the material, by a pump device 3, the suction end whereof is connected to at least one transport container 51 and separator device 20, preferably to its lower part, and that at least part of the conveyor air on the pressure side of the pump is conducted to a separator device 20, preferably to its upper part.

Typically the transport container 51 is a transport vehicle 50, such as a transport wagon or a transport truck.

According to another preferred embodiment, in the method solid particles are separated from the conveyor air at least by one second separator element 20', which is arranged on the suction side of the pump device 3, in between the transport container 51 and/or the first separator device 20 and the pump device 3.

According to a typical embodiment, in the method the material contained in the separator device 20 is manipulated by the material stirring/conveying means 27, for instance by stirring and/or conveying material towards the drain channel 22.

According to a preferred embodiment, in the method underpressure is created in the circuit by at least one pump device 3, such as a vacuum generator and/or a blower, the suction end whereof is connected to the separator device 20 and/or to the transport container 51.

According to a preferred embodiment, in the method material is fed to the conveyor pipe 100 via material feed points 61, which are waste feed points, such as waste bins or refuse chutes.

Typically in between the material feed point 61 and the conveyor pipe 100, there is arranged at least one valve element 60, and by opening and closing said valve element, it is possible to adjust the feeding of material and/or makeup air to the conveyor pipe.

The invention also relates to an arrangement in a pneumatic material conveying system, such as a waste conveying system, comprising at least one feed point 61 of material, particularly waste material; a material conveyor pipe 100, which is connectable to the feed point 61 and to a separator device 20, where the material to be conveyed is separated from the conveyor air; as well as means 3 for creating a pressure difference in the conveyor pipe 100, at least for the duration of the process of conveying the material. The arrangement comprises means for connecting the transport container 51 to the material conveying system and means for transferring at least part of the material accumulated in the separator device 20 from the separator device 20 to the transport container 51, particularly a waste container, by employing in the conveying of material from the separator device 20 to the transport container 51 means 3 of the material conveying system for creating a pressure difference.

According to a preferred embodiment, the arrangement comprises means for connecting the transport container 51 to the separator device 20 by at least one first conveyor channel 22, 23, 24, 55, 52; and means for connecting the transport container to the suction side of the pump device 3 of the material conveying system by at least one second channel 108, 28, 26, 53, 54, so that material can be transferred from the separator device 20 to the transport container 51 by means of the suction created by the pump device 3 of the material conveying system.

According to a preferred embodiment, the transport container 51 is arranged to be connected as part of a circuit where conveyor air is circulated, at least during the process of conveying the material, by a pump device 3, the suction end whereof is arranged to be connected at least to one transport container 51 and to a separator device 20, preferably to its lower part, so that at least part of the conveyor air on the pressure side of the pump is arranged to be conveyed to the separator device 20, preferably to its upper part.

Typically the transport container 51 is arranged in a transport vehicle 50, such as a transport wagon or a transport truck.

According to another preferred embodiment, the arrangement comprises at least one second separator device 20', which is arranged on the suction side of the pump device 3, in between the transport container 51 and/or the first separator device 20 and the pump device 3.

According to yet a preferred embodiment, the separator element 20 comprises material stirring and/or conveying means 27.

For a man skilled in the art, it is obvious that the invention is not restricted to the above described embodiments only, but many modifications are possible within the scope of the appended claims. Such characterizing features that in the specification are possibly described together with other characterizing features can, when necessary, also be used separately.

The invention claimed is:

1. A method for conveying material in a pneumatic material conveying system, said conveying system comprising;
    at least one feed point of the material;
    a separator device having an input port and an output port;
    a transport container with an input port and an output port;
    a vacuum pump device having a pressure side and a suction side;
    a material conveyor pipe having one end connected to the input port of the separator device and extending to the at least one feed point;
    at least one first conveyor channel having one end connected to the output port of the separator device and an opposite end connected to the input port of the transport container;
    at least one second conveyor channel having one end connected to the output port of the transport container, and an opposite end connected to the suction side of the vacuum pump device;
    wherein the method for conveying the material using the conveying system comprises:
    activating the vacuum pump device to create a pressure difference in the material conveyor pipe in order to convey the material through the material conveyor pipe and into the separator device; conveying the material from the separator device and into the transport container by a suction created by the vacuum pump device; and
    at least part of conveyor air on the pressure side of the vacuum pump device is conducted to an upper part of the separator device.

2. The method according to claim 1, wherein the conveying system further comprises:
    at least one separator element which is arranged on the suction side of the vacuum pump device in a position between the transport container and/or the separator device and the vacuum pump device, and
    the method further comprising:
    activating the at least one separator element in order to separate solid particles from the conveyor air.

3. The method according to claim 1, wherein the conveying system further comprises:
    an actuator located adjacent to the separator device,
    a material stirring and conveying device provided with a screw located in a lower portion of the separator device,
    the method further comprising:
    activating the screw of the material stirring and conveying device in order to stir and convey the material contained in the separator device towards the at least one first conveyor channel connected to the separator device.

4. The method according to claim 1, the method further comprising:
    activating the vacuum pump device to create an underpressure in the at least one second conveyor channel.

5. The method according to claim 1, wherein the method further comprises:
    feeding the material to the material conveyor pipe through the at least one feed point.

6. The method according to claim 1, wherein the conveying system further comprises:
    at least one valve element located between the at least one feed point and the material conveyor pipe,
    the method further comprising:
    adjusting an amount of the material and an amount of makeup air fed into the material conveying pipe by opening and closing said at least one valve element.

7. The method according to claim 1, wherein the conveying system further comprises:
    a transport vehicle, and the transport container is provided in the transport vehicle,
    wherein the at least one first conveyor channel connects a first portion of the transport container to the separator device, and
    the at least one second conveyor channel connects a second portion of the transport container to the suction side of the vacuum pump device.

8. The method according to claim 1, wherein the conveying system further comprises:
    at least one second separator element which is arranged on the suction side of the vacuum pump device in a position between the transport container and/or the separator device and the vacuum pump device, and
    the method further comprising:
    activating the at least one second separator element in order to separate solid particles from the conveyor air.

9. The method according to claim 1,
    the method further comprising:
    activating the vacuum pump device to create an underpressure in the at least one second conveyor channel.

10. The method according to claim 1, wherein the conveying system further comprises:
    a dust filter located between the separator element and the suction side of the vacuum pump device.

11. A method for conveying material in a pneumatic material conveying system, said conveying system comprising: at least one feed point of the material;
    a separator device having an upper part and a lower part;
    a transport container with a first portion and a second portion;
    a vacuum pump device having a pressure side and a suction side;
    a material conveyor pipe having one end connected to an input port of the separator device and extending to the at least one feed point;
    at least one first conveyor channel having one end connected to the lower part of the separator device and an opposite end connected to the first portion of the transport container;
    at least one second conveyor channel having one end connected to the second portion of the transport container, and an opposite end connected to the suction side of the vacuum pump device;
    wherein the method for conveying the material using the conveying system comprises:
    activating the vacuum pump device to create a pressure difference in the material conveyor pipe in order to convey the material through the material conveyor pipe and into the separator device; and
    conveying the material from the separator device and into the transport container by a suction created by the vacuum pump device.

12. The method according to claim 11, wherein at least part of conveyor air on the pressure side of the vacuum pump device is conducted to an upper part of the separator device.

13. The method according to claim 11, wherein the conveying system further comprises:
   at least one second separator element which is arranged on the suction side of the vacuum pump device in a position between the transport container and/or the separator device and the vacuum pump device, and
   the method further comprising:
   activating the at least one second separator element in order to separate solid particles from the conveyor air.

14. The method according to claim 11, wherein the conveying system further comprises:
   an actuator located adjacent to the separator device,
   a material stirring and conveying device provided with a screw located in a lower portion of the separator device,
   the method further comprising:
   activating the screw of the material stirring and conveying device in order to stir and convey the material contained in the separator device towards the at least one first conveyor channel connected to the separator device.

15. The method according to claim 11, further comprising:
   a dust filter located between the separator element and the suction side of the vacuum pump device.

\* \* \* \* \*